US007281644B2

(12) United States Patent
Cater

(10) Patent No.: US 7,281,644 B2
(45) Date of Patent: Oct. 16, 2007

(54) VALVE MECHANISM

(75) Inventor: Miro Cater, Daytona Beach, FL (US)

(73) Assignee: Ing. Erich Pfeiffer GmbH, Radolfzell (DE)

( * ) Notice: Subject to any disclaimer, the term of this patent is extended or adjusted under 35 U.S.C. 154(b) by 124 days.

(21) Appl. No.: 10/892,818

(22) Filed: Jul. 16, 2004

(65) Prior Publication Data

US 2005/0023302 A1 Feb. 3, 2005

(30) Foreign Application Priority Data

Jul. 18, 2003 (DE) ................................ 103 34 032

(51) Int. Cl.
*B65D 88/54* (2006.01)
*G01F 11/00* (2006.01)

(52) U.S. Cl. ................................ 222/321.7; 222/321.2; 222/341

(58) Field of Classification Search ..... 222/320–321.9, 222/341, 383.1, 383.2, 383.3, 0.6, 0.7, 0.8, 222/0.9
See application file for complete search history.

(56) References Cited

U.S. PATENT DOCUMENTS 2,534,504 A * 12/1950 Engstrom .................. 222/309
3,359,917 A * 12/1967 Cooprider .................. 417/518
4,050,860 A * 9/1977 Beres ......................... 417/444
4,228,931 A * 10/1980 Ruscitti et al. .......... 222/321.2
4,245,967 A 1/1981 Busselet
4,252,507 A * 2/1981 Knickerbocker ............ 417/444
4,991,747 A * 2/1991 Van Brocklin ........... 222/321.3
5,752,627 A * 5/1998 Vandromme et al. ....... 222/137
5,775,547 A * 7/1998 Foster et al. ............. 222/321.3
5,850,948 A * 12/1998 Garcia et al. ............ 222/321.9
6,299,029 B1 * 10/2001 Bonningue .................. 222/207
6,332,561 B1 * 12/2001 Garcia et al. ............ 222/321.3

FOREIGN PATENT DOCUMENTS

EP 0 835 820 A1 4/1998
IT 0374348 * 6/1990 ............. 222/321.2

OTHER PUBLICATIONS

European Patent Office Search Report dated Jun. 7, 2006 (3 pages).

* cited by examiner

*Primary Examiner*—Kevin Shaver
*Assistant Examiner*—Stephanie E. Tyler
(74) *Attorney, Agent, or Firm*—Flynn, Thiel, Boutell & Tanis, P.C.

(57) ABSTRACT

A valve mechanism for a pressure chamber, particularly a pumping device, includes a tappet and a valve disk, in which the valve disk is attached to the tappet. The valve disk is provided on the tappet so as to be movable in relative manner between a starting and an end position.

15 Claims, 5 Drawing Sheets

VALVE MECHANISM

Figure 1:
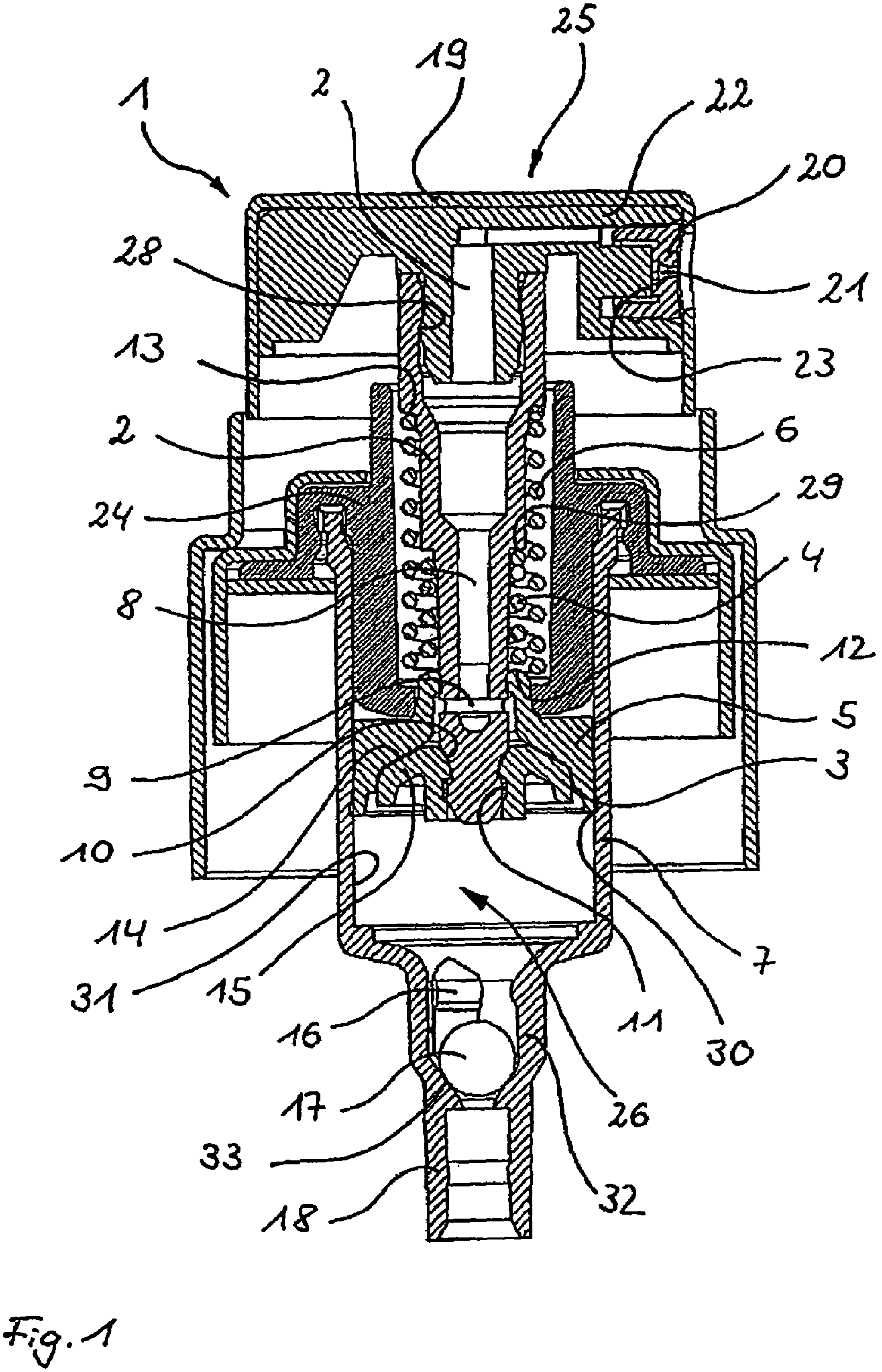

The following disclosure is based on German Patent Application No. 103 34 032.7, filed Jul. 18, 2003, filed on Jul. 18, 2003, which is incorporated into this application by explicit reference.

The invention relates to a valve mechanism for a pressure chamber with a tappet and a valve disk, the latter being attached to the tappet.

Numerous different constructional embodiments of such valve mechanisms are known from the prior art. They are in particular used for influencing volume flows of gaseous or liquid media. For this purpose a valve mechanism is fitted to an opening of a pressure chamber in such a way that said opening can at least partly be closed by the valve disk of the valve mechanism. When the valve disk does not completely close the pressure chamber opening, there can be a volume flow of the in particular liquid or gaseous medium. An underpressure or overpressure with respect to a pressure chamber environment prevails in the pressure chamber. Areas of use for such valve mechanisms are in particular pumps, compressors and motors, as well as in the field of control and regulating technology for media.

The problem of the invention is to provide a valve mechanism of the aforementioned type permitting an improved media flow.

This problem is solved in that the valve disk is attached in relative movable manner to the tappet. In the case of a rigid and in particular integral design of valve disk and tappet, as is known from the prior art, there is a specific flow characteristic for the medium when flowing through the pressure chamber opening. This flow characteristic is based on the fact that the medium must flow past the valve mechanism and is in particular deflected or reversed by the valve disk. As a result of the rigid connection between valve disk and tappet with each tappet position is associated precisely one valve disk position with respect to the pressure chamber opening. As a result a predeterminable flow characteristic for the medium is established. In the case of the valve mechanism according to the invention, where there is a relative movement between valve disk and tappet, the association of the valve disk position with respect to the tappet position remains variable. Thus, the valve disk can move in any tappet position into a flow-favourable position, where a minimum flow resistance for the medium is ensured. A precise tappet positioning for ensuring an optimum flow characteristic in the valve area is consequently-unnecessary for the valve mechanism according to the invention. Moreover a regulating distance for the tappet can be reduced, because the sole function of the tappet is to guide the valve disk and bring it from a sealing position into an open position. In the sealing position the valve disk interacts in positive and/or non-positive manner with a valve seat provided at the pressure chamber opening and is able to seal the latter. Through an appropriate adaptation of the valve disk to the valve seat, it is possible to bring about a self-intensification of a sealing action between valve disk and valve seat. As soon as the pressure chamber is opened by the valve mechanism and there is a medium flow past the valve disk, the disk is displaced into the aforementioned flow-favourable position. Compared with a rigid arrangement of the valve disk on the tappet, as is known from the prior art, as a result of the valve disk mobility relative to the tappet there is an overproportional release of a flow cross-section. In particular, fluid dynamic effects such as buoyancy and eddy formation come to bear and can influence the position of the valve disk relative to the regulating distance of the tappet.

According to a development of the invention, on the tappet is provided at least one blocking element to limit the displacement for the valve disk. A blocking element can fix a starting and/or end position of the valve disk relative to the tappet. The blocking element can in particular be in the form of a positively and/or non-positively acting, one-piece or multipart geometry on the tappet. A blocking element can in particular be constructed as a lug, pin, disk or cone, at least partly circumferential collar projection or undercut. Between the starting and/or end position definable by blocking elements the valve disk can move freely or in damped manner relative to the tappet and for this purpose damping means can be provided. In addition, a prestressing force of the tappet on the valve disk can occur and permits a movement of the valve disk only when the prestressing force is overcome.

According to a further development of the invention the tappet contains a medium channel. This ensures a medium volume flow exclusively determined by the geometrical characteristics of the valve mechanism. The medium which is to be influenced by the valve mechanism flows in the case of a suitable fitting of the valve mechanism in the pressure chamber opening, exclusively through the tappet medium channel. The medium channel can in particular extend almost completely along the tappet and is at least zonally centrally provided in said tappet. For manufacturing reasons, orthogonally to a tappet longitudinal axis the tappet can contain cross-holes, which allow an inflow or outflow of the medium with respect to the medium channel.

According to a further development of the invention, the medium channel is placed in a manner closable by the valve disk in the tappet. As a result a valve function of the valve mechanism is not brought about by the interaction of the valve disk with the valve seat in the pressure chamber, but instead directly by the relative movement of valve disk with respect to tappet. The valve disk is attached to the tappet in such a way that inlet or outlet ports of the medium channel in the tappet can be closed through the valve disk. A combination of valve action between valve disk and valve seat and between valve disk and medium channel is conceivable, so that a specific valve opening and closing characteristic can be defined.

According to a further development of the invention, a piston sleeve can be provided on the tappet and is loaded by at least one elastic restoring means and is fitted so as to move relative to the tappet. As a result of the elastic restoring means, the piston sleeve is under an initial stress relative to the tappet, independently of the given open or closed position. The elastic restoring means can in particular be an elastically flexible, one-piece extension on the piston sleeve or also a separate spring component. A piston sleeve permits the use of the inventive valve mechanism in a pumping device. The piston sleeve interacts with one wall of the pressure chamber and in the circumferential area of the piston sleeve gives rise to a sealing action. The piston sleeve seals with respect to a pressure chamber environment a pressure chamber section. Thus, by moving the piston sleeve in or counter to the direction of a longitudinal axis of the pressure chamber, a medium in the latter can be compressed or evacuated. As a result of an at least zonal deformability of the piston sleeve a spring action can be brought about, which in particular allows a stagewise relative movement of piston sleeve relative to tappet. The deformability of the piston sleeve can in particular be implemented in a cylinder jacket area oriented coaxially to an axis of symmetry of the piston sleeve. When axial forces arise, the cylinder jacket area can be compressed and there is either a diameter increase or decrease of the cylinder jacket area. On the face remote from the piston sleeve the cylinder jacket area can be supported on a circumferential, annular shoulder of the tappet. As a result of the mobility of the piston sleeve relative to the tappet an area between the piston sleeve and valve disk can be opened or closed with respect to the pressure chamber. In the area between valve disk and piston sleeve it is in particular possible to provide the inlet or outlet ports of the medium channel, so that a valve function is possible through the relative movement of piston sleeve and valve disk with respect to one another.

The problem of the invention is also solved or further developed in that the elastic restoring means is constituted by a valve spring in the form of a separate component for the application of a valve closing force by the piston sleeve on the valve disk. For fixing a clearly defined piston sleeve position a separate valve spring is provided ensuring a valve closing force from the piston sleeve on the valve disk. As a result of the design of the valve spring as a separate component, it is possible in simple manner and in a broad spectrum to influence the valve opening characteristic of the valve mechanism. For this purpose the valve spring can in particular be manufactured from a metallic material. Metallic materials, particularly alloys with constituents such as in particular nickel, iron, chromium and/or titanium permit a particularly compact construction of a valve spring. The metallic material allows a storage of spring energy in a small volume, so that the valve mechanism size is not decisively influenced by the valve spring. Through the choice of one of the aforementioned materials or a corresponding alloy, it is possible to reliably predetermine the spring characteristic within a wide range. The use of such metallic springs permits mass production of the valve mechanism at a very high quality level. The design of the valve spring as a helical spring with a substantially cylindrical contour is brought about by concentrically positioned, successive turns of a spring wire. Helical springs are characterized by a compact construction and in the case of an appropriate choice allow a substantially linear spring design. In addition, a helical spring can also be constructed as a progressively or degressively acting valve spring, so that an adaptation to the valve mechanism requirements is possible using simple means. The valve spring can for this purpose be designed as a compression or tension spring and this takes place as a function of the arrangement of the valve spring relative to the piston sleeve. A helical spring can in particular have several sections with different diameters, pitches and/or spring wire thickness.

According to a further development of the invention, the valve spring is supported on an annular shoulder of the piston sleeve and/or the tappet. As a result for limited technical effort and expenditure it is possible to bring about an effective force introduction from valve spring to piston sleeve and/or tappet. An annular shoulder is in particular constructed as a circumferential collar.

According to a further development of the invention the valve spring is positioned concentrically to a return spring of a pumping device. As a result of a concentric arrangement of the valve spring relative to the tappet a particularly compact valve mechanism construction can be implemented. This is particularly the case if the valve spring is positioned concentrically to a return spring of a pumping device, the return spring returning the tappet to a starting position after operating the pumping device.

According to a further development of the invention, the valve disk and/or the piston sleeve are made from a plastics material, particularly LDPE or HDPE. As a result of the manufacture of the valve disk and/or piston sleeve from LDPE or HDPE, a particularly inexpensive and mechanically reliable valve mechanism can be produced. Plastic injection moulding is particularly appropriate for the manufacture of the valve disk and/or piston sleeve.

According to a further development of the invention the valve disk has a circumferential joint zone, which can in particular be in the form of a solid-state body joint, which permits a mobility of an outer area of the valve disk relative to an inner area solely through an elastic deformation. As a result the valve disk can make an additional contribution to the valve function of the valve mechanism. After overcoming the sealing action between valve disk and medium channel, the valve disk can collapse through the forces which occur and therefore frees a larger flow cross-section, so that a particularly spontaneous medium flow can occur.

According to a further development of the invention a guide section is provided on the valve disk. The valve disk guide section is used for transferring forces from the valve disk to the tappet and vice versa. A force transfer more particularly takes place through an at least stagewise, positive and/or non-positive engagement of the valve disk on the tappet in the vicinity of the guide section. Axial, normal and radial forces or combinations thereof can be transmitted or transferred.

According to a further development of the invention the guide section is constructed as a cylinder wall. The guide section can be particularly easily manufactured, particularly during the manufacture of the valve disk using a plastic injection moulding process. The guide section can be moulded during valve disk manufacture. Alternatively it can be provided subsequently by machining.

According to a further development of the invention, on the tappet is provided a guide zone corresponding to the guide section permitting a relative movement of valve disk with respect to tappet. A corresponding guide zone can in particular have a cross-section, which at least substantially corresponds to a cross-section of the valve disk in the guide section. Preferred cross-sections for the guide zone are particularly circular, oval or prismatic.

According to a further development of the invention, pressure surface ratios between the valve disk and piston sleeve are such that in a valve closing position a working face of the valve disk is larger than a working face of the piston sleeve. A pressure face corresponds to a hydraulically acting surface of the valve disk or piston sleeve. Both the pressure faces and working faces can be determined by a projection of a geometry of the valve disk or piston sleeve on a plane of projection. The plane of projection is oriented orthogonally to the axis of symmetry of the piston sleeve. As a result of the inventive design of the working faces, in an initial phase of medium discharge it is possible to bring about an unequal force distribution between valve disk and piston sleeve. The medium in the pressure chamber is compressed through the operation of the tappet with the aid of the piston sleeve and the valve disk. There is a uniform pressure build-up in the pressure chamber and this leads to compressive forces on tappet, valve disk and piston sleeve. As a result of the larger working face of the valve disk in the valve closing position, a higher compressive force acts on the valve disk as compared with the piston sleeve. As a result the valve disk is pressed strongly onto the piston sleeve and increases in an initial medium discharge phase a sealing action between valve disk and piston sleeve.

According to a further development of the invention, the valve disk and piston sleeve have supporting faces corresponding to one another and which are provided with supporting force components acting radially to a pumping axis. In order to be able to ensure a completely satisfactory sealing action particularly with respect to a casing wall of the pressure chamber and also with respect to the valve disk, the piston sleeve is made from an elastic material. So as to ensure the sealing action with respect to the casing wall, even when there are unfavourable ratios, especially high temperatures, in addition to an axially directed closing function and at least in the rest position and the starting phase of medium discharge, the piston sleeve is also radially outwardly supported by the valve disk. Consequently the valve disk prevents an uncontrolled inward piston sleeve deformation and therefore ensures the sealing action relative to a casing wall of the pumping device. The higher the support diameter of the valve disk relative to a maximum diameter of the piston sleeve the greater the sealing action.

According to a further development of the invention the valve disk has a modulus of elasticity higher than that of the piston sleeve. Thus, the valve disk is less deformed by forces, particularly compressive forces than the piston sleeve and can consequently more effectively exert its supporting function relative to the piston sleeve. The modulus of elasticity as a stress-strain ratio can only be determined in the case of brief loading with plastics, because plastics have a flow tendency during prolonged loading. It is consequently also possible to give the Shore hardness for characterizing the elasticity characteristics of valve disk and piston sleeve, the latter having a lower Shore hardness than the valve disk.

Further advantages and features of the invention can be gathered from the following description of preferred embodiments, the attached claims and drawings, wherein show:

FIG. 1 In a planar sectional representation a diagrammatic view of a pumping device with valve mechanism and an inlet valve in the form of a ball valve.

Figure 2:
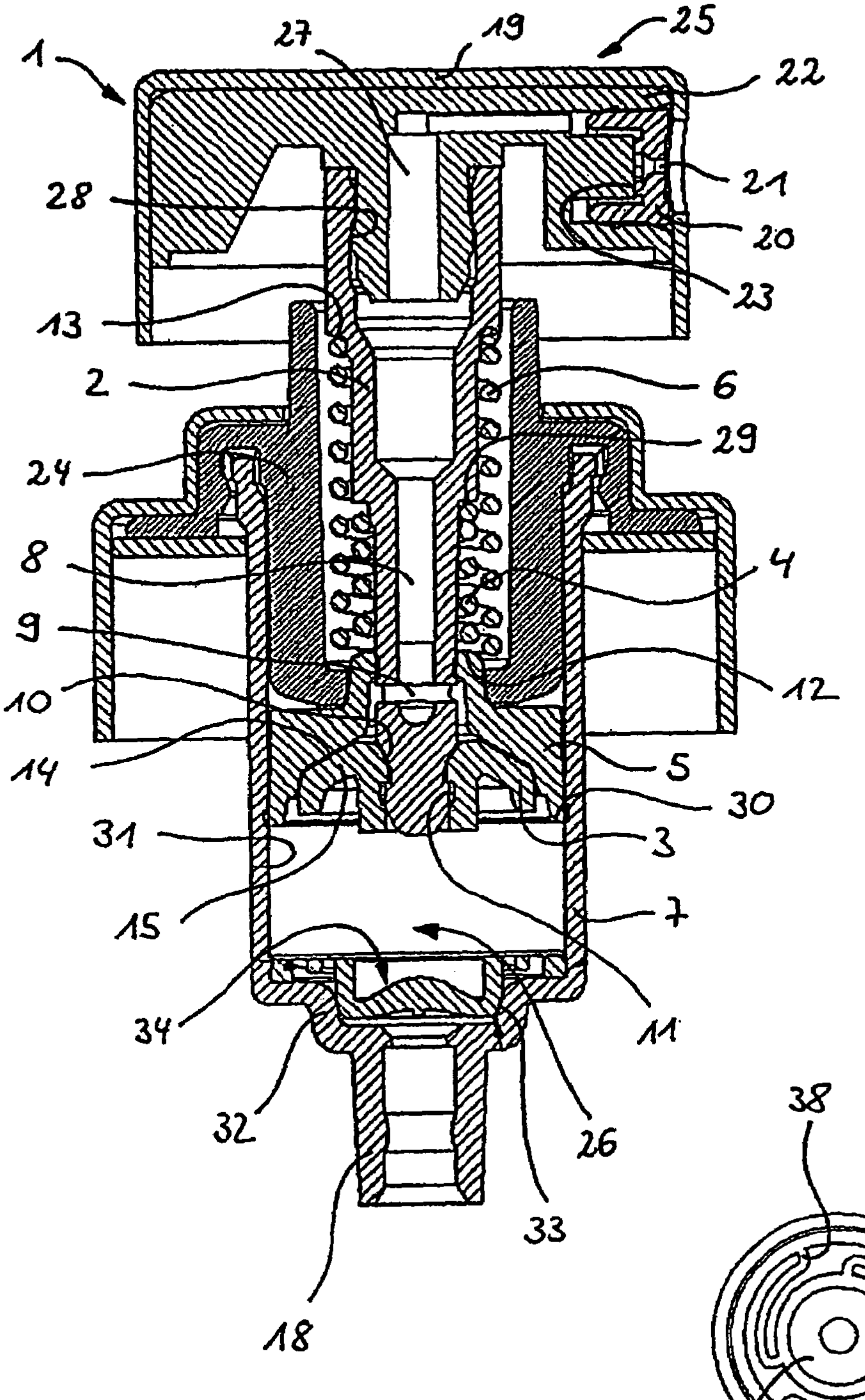

FIG. 2 In a planar sectional representation a diagrammatic view of a pumping device with valve mechanism with an inlet valve constructed as a diaphragm valve.

Figure 3:
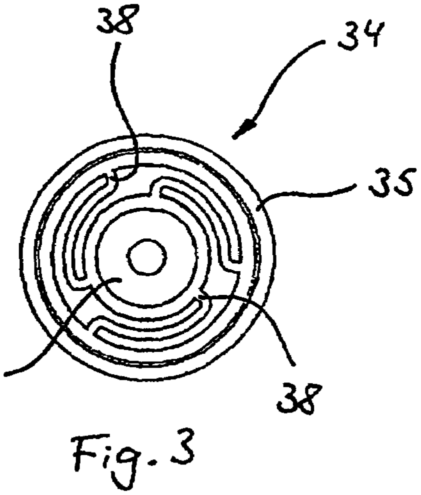

FIG. 3 In a planar representation a plan view of a diaphragm valve.

Figure 4:
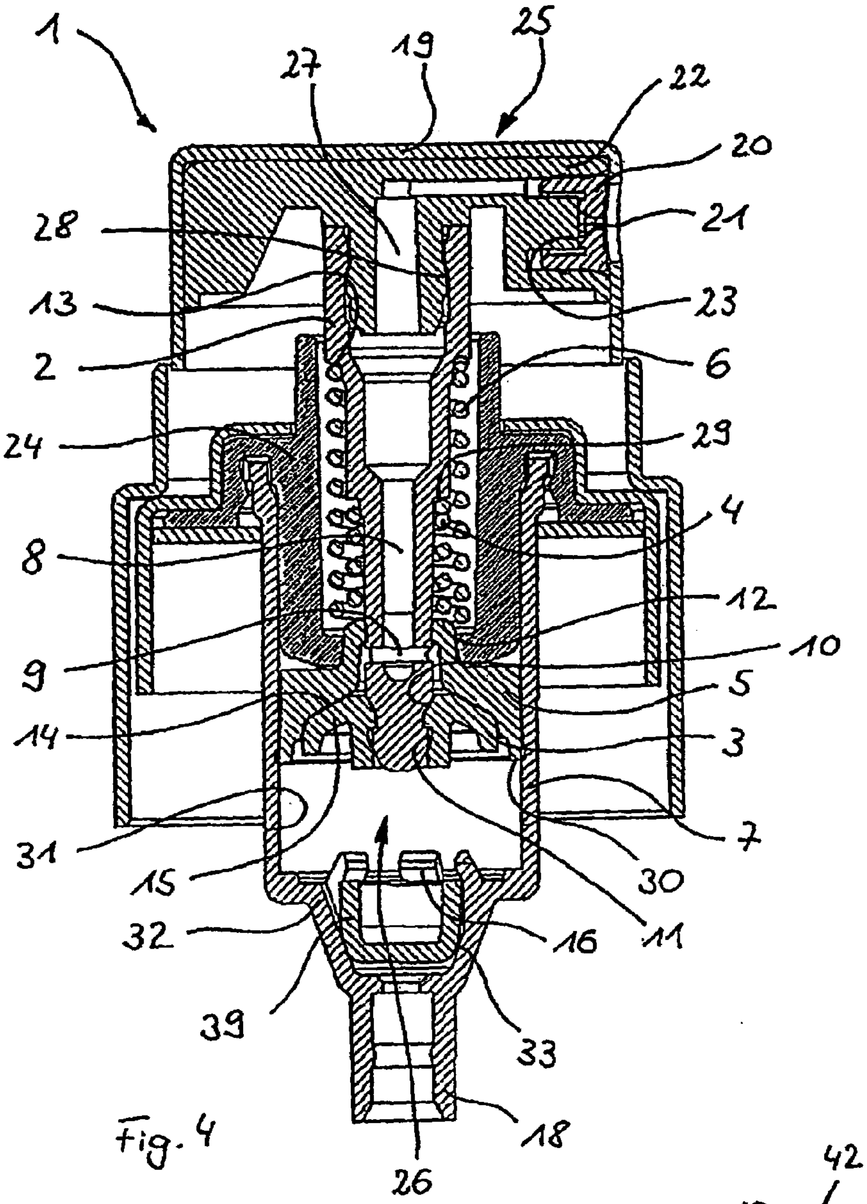

FIG. 4 In a planar sectional representation a diagrammatic view of a pumping device with valve mechanism and an inlet valve in the form of a hat or cap valve.

Figure 5:
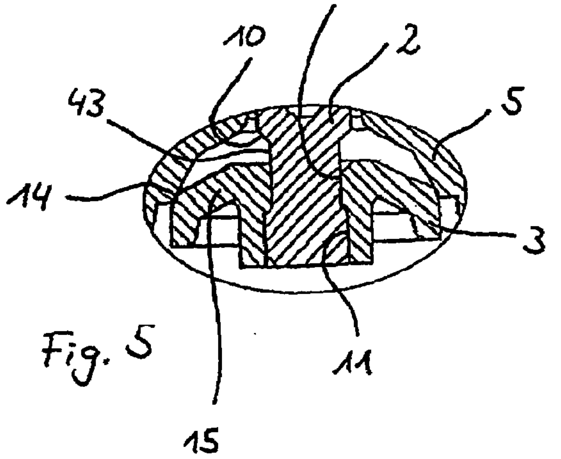

FIG. 5 In a planar sectional representation a diagrammatic detail view of a displaceably fitted valve disk of a pumping device.

Figure 6:
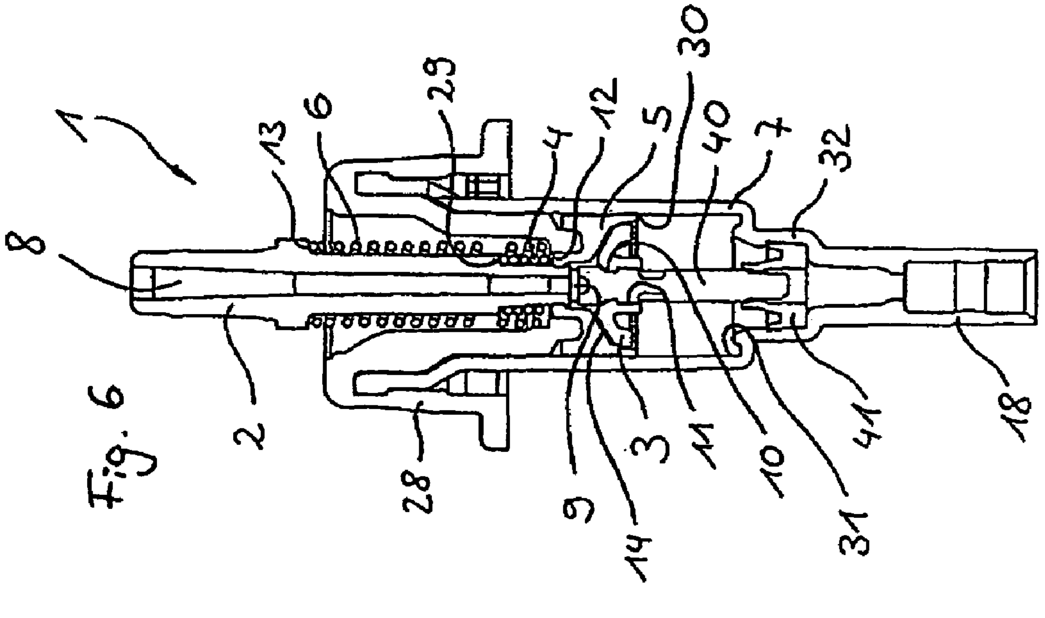

FIG. 6 In a planar sectional representation a pumping device with valve mechanism with an inlet valve in the form of a piston-type valve in the rest position.

Figure 7:
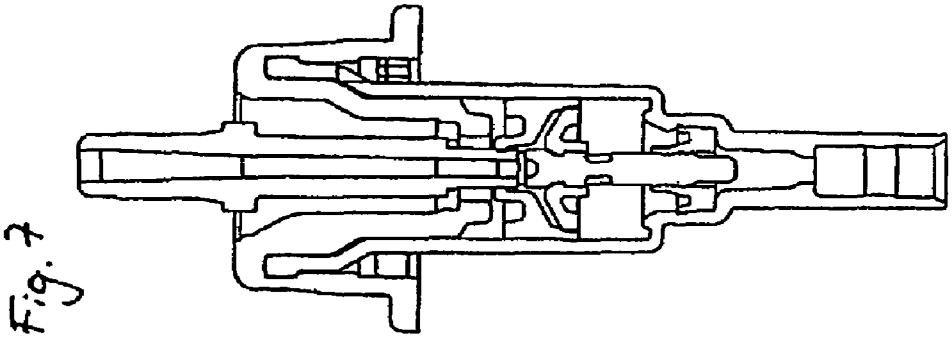

FIG. 7 In a planar view a pumping device according to FIG. 6 in an intermediate operating position.

Figure 8:
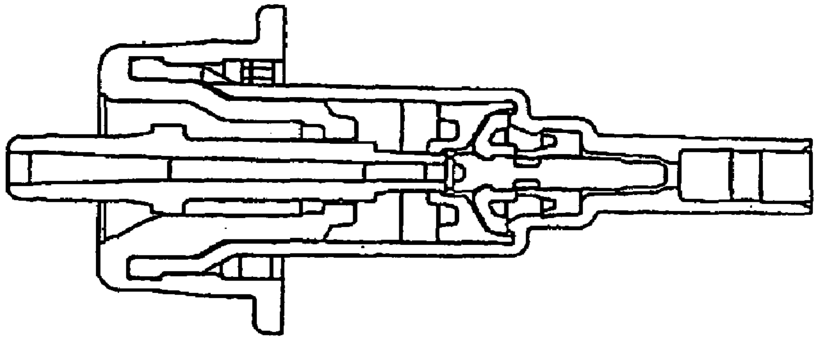

FIG. 8 In a planar sectional representation a pumping device according to FIGS. 7 and 8 in a final operating position.

Figure 9:
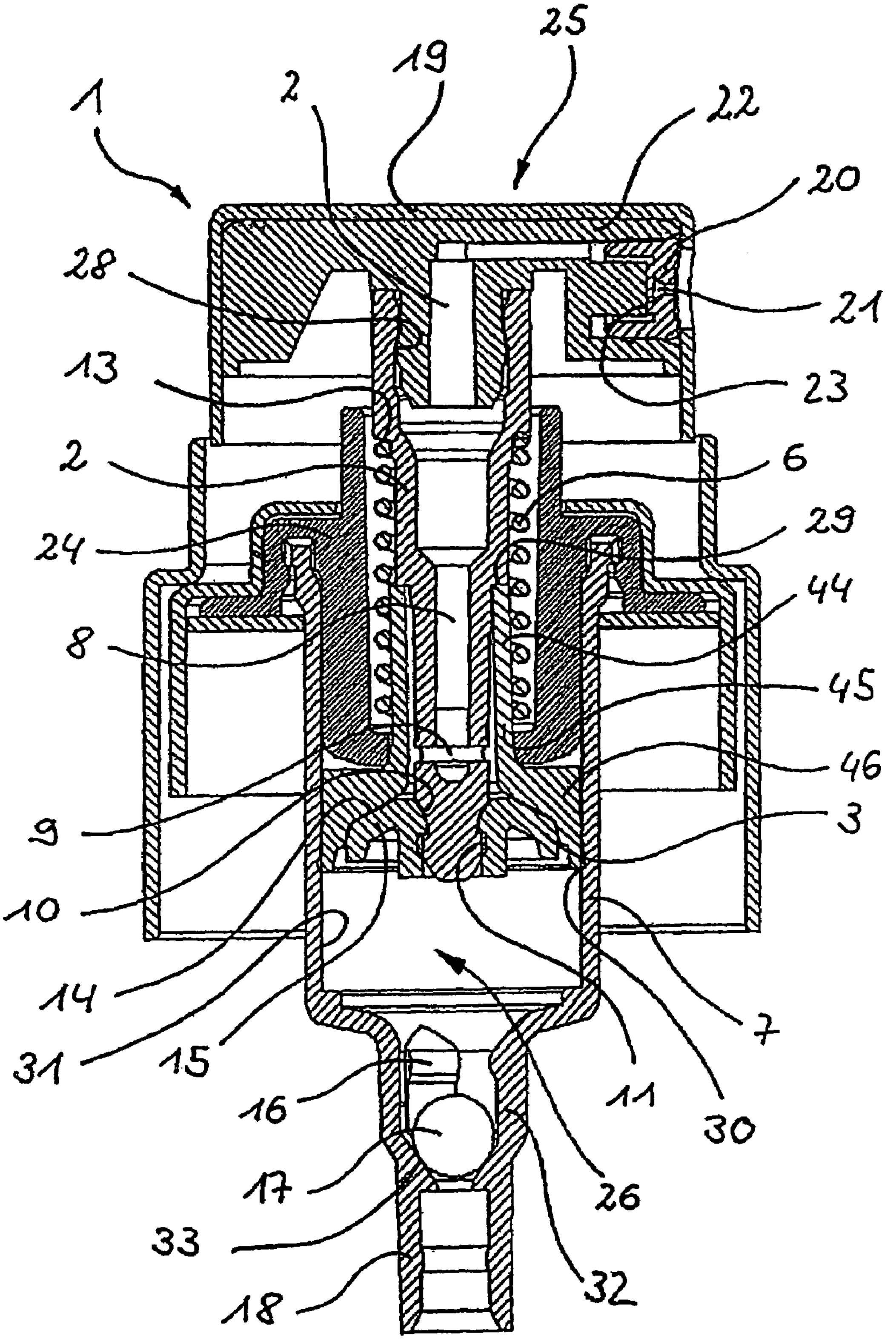

FIG. 9 In a planar sectional representation a diagrammatic view of a pumping device with valve mechanism and integrally constructed spring piston sleeve.

A pumping device 1 shown in FIGS. 1, 2 and 4 has a nozzle head 25, together with a medium pump 26, each of these components being built up from numerous individual components. The nozzle head 25 has a guide element 22 provided with a medium conduit 27. The medium conduit 27 issues onto an outer face of the guide element 22 in a not further designated nozzle receptacle in which is fitted a nozzle 20. Together with the guide element 22, the nozzle 20 forms a discharge valve for the nozzle head and a sealing action for the medium conduit 27 is brought about by facing flat sealing faces 23 of the guide element 22 and nozzle 20. The nozzle 20 also has a discharge opening 21 through which a pressurized medium can be delivered to the environment and the medium is in particular atomized. As a decorative element and for forming a handle a cover 19 is inverted over the guide element 22 and in the vicinity of the nozzle 20 is provided with a not further designated recess for the passage of media.

In a connecting area 28 the nozzle head 25 is positively and nonpositively connected to a tappet 2 of the medium pump 26 and simultaneously provides a communicating connection between a medium channel 8 of the tappet 2 and the medium conduit 27. The tappet 2 is constructed as an elongated, rotationally symmetrical and zonally hollow component, the medium channel 8 extending along an axis of symmetry of the tappet 2. At an end remote from the nozzle head 25 the tappet 2 has a cross-hole 9 orthogonally to the axis of symmetry of the tappet 2. The cross-hole 9 is constructed so as to communicate with the medium channel 8. On the tappet 2 are provided several circumferential annular shoulders like the tappet collar 13, valve spring collar 29 or stop collar 11. Said annular shoulders of the tappet 2 serve for the positive reception of a restoring spring 6, a valve spring 4 and a valve disk 3. The stop collar 11 of the tappet 2 serves as a blocking element for the valve disk 3 and limits a starting position of the valve disk 3 in a rest position of the valve mechanism. A further blocking element for the valve disk 3 is provided in the form of a stop cone 10 on tappet 2. The restoring or return spring 6 and valve spring 4 are constructed as helical springs arranged concentrically to the tappet 2, which leads to a particularly compact arrangement, whilst simultaneously decoupling the two springs. The stop cone 10 on tappet 2 in conjunction with corresponding pressure and sealing faces on the piston sleeve 5 form supporting force components acting radially to a pumping axis of the pumping device 1 and axially acting sealing force components in the valve closing position.

As shown in the particularly preferred embodiment of FIG. 5, the valve disk 3 is fitted movably in the longitudinal direction of tappet 2 between end positions formed by the stop collar 11 and stop cone 10. The valve disk 3 is constructed as a rotationally symmetrical plastics part. A cross-section of the valve disk 3 is determined by a substantially cylindrical section in which is provided a centrally positioned hole, which serves as a guide face 42 with respect to a corresponding, cylindrical guide zone 43 of the tappet. The diameter of the hole is matched with the external diameter of the guide zone 43 of tappet 2, which permits a relative movement of the valve disk in the direction of the axis of symmetry of the tappet 2. On one end of the cylindrical section of the valve disk 2 is provided a circumferential, umbrella-like contour, which forms the actual valve disk 3. On a conically shaped outer face, the umbrella-like contour has a sealing face 14. A joint zone 15 acting as a solid-state body joint is provided in a transition area between the cylindrical section and umbrella-like contour. The joint zone 15 permits a relative movement of the umbrella-like contour with respect to the cylindrical section of the tappet 2 through an elastic deformation.

In the rest position shown in FIGS. 1, 2, 4 and 6, a piston sleeve 5 rests directly on a sealing face 14 of the valve disk 3, is positioned centrally with respect to said disk 3 and is displaceably fitted on the tappet 2. On a face facing the nozzle head 25, the piston sleeve 5 has a sleeve collar 12 serving as a support for the valve spring 4. On a face remote from the sleeve collar 12, the piston sleeve 5 has a circumferential sealing edge 30, which in conjunction with a cylinder wall 31 of a pressure chamber 7 constitutes a longitudinally displaceable seal. Like the valve disk, the piston sleeve 5 is constructed as a rotationally symmetrical plastics part. It has a stepped, cylindrical inner hole, which issues into a conical sealing area, where the sealing face 14 is directed towards the valve disk 3. An outer contour of the piston sleeve 5 has a substantially stepped, cylindrical form and on a side remote from the sealing face 14 has a sleeve collar 12 in the form of a cylindrical annular shoulder.

In a valve closing position, where the valve disk 3 is pressed by the return spring 5 and/or the valve spring 4 onto the piston sleeve 5 and also in an initial phase of a medium discharge, a working face of the valve disk 3 is larger than the working face of the piston sleeve. The working face corresponds to a hydraulically active surface and can be determined by the projection of a geometry of the valve disk 3 or piston sleeve 5 onto a plane of projection. The plane of projection is oriented orthogonally to the axis of symmetry of the piston sleeve 5. In the embodiments according to FIGS. 1, 2 and 4 to 9, the working face of the valve disk 3 has a circular ring shape and an inner circular ring diameter corresponds to the central hole in the valve disk 3. An outer circular ring diameter is determined by a maximum diameter at which the valve disk 3 comes into contact with the piston sleeve 5 in the valve closing position. The circular ring working face of the piston sleeve 5 in the valve closing position is determined by a diameter of the pressure chamber and by the outer circular ring diameter of the valve disk 3. In exemplified manner, the working face of the piston sleeve 5 in FIGS. 1, 2 and 4 to 9 is approximately 60% of the working face of the valve disk 3. Thus, in the initial medium discharge phase only 60% of the compressive force acting on the valve disk acts on the piston sleeve. Since, according to the invention, the valve disk 3 can move relative to the tappet 2, as a result of the compressive force occurring it can be displaced towards the piston sleeve 5 and consequently the latter in said initial phase is supported more particularly with respect to radial supporting force components. As a result of the displacement of the valve disk 3 in the direction of the piston sleeve 5, a valve closing force between piston sleeve 5 and valve disk 3 is increased and consequently a design-based valve opening is still ensured under extreme limiting conditions. Other compressive face ratios can be obtained by modifying the geometries of piston sleeve 5 and valve disk 3.

On a face remote from the nozzle head 25, the pressure chamber 7 is bounded by a valve housing 32, which issues into a connecting piece 18 for receiving a not shown riser. In the valve housing 32 is fitted a ball valve 17 according to FIG. 1. In the rest position shown, the ball valve 17 rests in a valve seat 33 and consequently forms an inlet valve for the pressure chamber 7, which ensures a sealing action with respect to a potential overpressure within the pressure chamber 7. The ball valve 17 can be moved by a vacuum in the pressure chamber 7 up to a cam 16 in the direction of the nozzle head 25 and thereby frees a flow cross-section for an inflowing medium.

The pumping device shown in FIG. 2 has in place of the ball valve 17 a diaphragm valve 34 which, as shown in FIG. 3, has an outer ring 35, a valve body 36 and three guide arms 37. In an installation position such as is shown in FIG. 2, the outer ring 35 of the diaphragm valve 34 is fitted non-positively in the pressure chamber 7 of medium pump 26. In the rest position, the valve body 36 rests tightly in the valve seat 33, but during a return stroke of the medium pump 26 can be raised from the valve seat 33 by the resulting underpressure and consequently frees the flow cross-section for the inflow of medium from a not shown medium container into the pressure chamber 7. The valve body 36 is centred by the elastically deformable guide arms 37, so that when the underpressure or vacuum decreases it can return to the intended sealing position. Such a sealing movement is aided by the elasticity of the deflected guide arms. The valve body 36 and outer ring 35 are arranged concentrically to one another and the guide arms 37 are fitted in each case in connecting sections 38 radially to the valve body 36 or outer ring 35. The area of the guide arms 37 between the connecting sections 38 is substantially circular and concentric to outer ring 35 and valve body 36.

In the case of the pumping device 1 shown in FIG. 4, the diaphragm valve 34 or ball valve 17 is replaced by a hat or cap body 39, which in the rest position ensures a sealing of the valve seat 33. When an underpressure occurs in the pressure chamber 7 of medium pump 26, the hat body 39 is displaced from its rest position and consequently frees a cross-section for the through-flow of medium. The movement of the hat body 39 in the direction of the nozzle head 25 is limited by cams 36, so that the hat body 39 assumes a clearly defined position even in an open position of the inlet valve and when there is a pressure build-up in the pressure chamber 7 it immediately returns to the sealing position.

In the case of the pumping devices 1 shown in FIGS. 6, 7 and 8, the inlet valve is formed by a piston rod integrally connected to the tappet 2. In order to bring about a sealing action within the pressure chamber, a valve sleeve 41 is provided in valve housing 32. As a result of the integral construction of the piston rod 40 and tappet 2, there is a forced control for the inlet valve, because on pressing down the tappet 2 a thickened area of the piston rod 4 enters into a sealing action with the valve sleeve 41. As a function of the arrangement of the thickened area on the piston rod 40, it is possible to influence the amount of medium to be discharged from the pressure chamber 7, because only when the sealing action occurs between the piston rod 40 and valve sleeve 41 is there a pressure build-up in pressure chamber 7. Thus, it is possible to easily adapt a dosage quantity of the pumping device 1 to the customer-specific needs. The only parameter for the adaptation of the dosage quantity is the length of the thickened area in said embodiment.

In the case of the pumping device shown in FIG. 9, the piston sleeve is constructed as a spring piston sleeve 46. For this purpose on the actual piston sleeve is provided an elastic restoring means in the form of a hollow cylindrically shaped spring section 44, which in the present embodiment is constructed integrally with the piston sleeve so as to form the spring piston sleeve. The spring section is supported on the valve spring collar 29 of tappet 2 and is deformed by the compressive forces on the piston sleeve. As a function of the design of the spring section 44 and a transition area 45, it is possible to bring about a spring action both by bending in and by bending out the hollow cylindrical spring section 44.

In a rest position such as is shown in FIGS. 1, 2, 4 and 6, the tappet 2 is held in a starting position by spring energy stored in the return spring 6. Simultaneously the valve spring 4 is in a substantially relaxed rest position, a sealing action for the medium channel 8 is essentially ensured by a force flux from the return spring 6 to the sealing insert 24, piston sleeve 5 and valve disk 3 and via the tappet 2 back to the return spring 6. For the inlet valves shown in FIGS. 1 and 2 a sealing state of the inlet valve is undefined, whereas with the inlet valves according to FIGS. 2 and 5 there is a clearly defined sealing state of the inlet valve. As soon as a force is exerted on the cover 19 constructed as a handle, a force transfer takes place to the tappet 2 via guide element 22. From tappet 2 the force introduced acts on the return spring 6 and leads to the shortening thereof and at the same time to a tappet movement towards the inlet valve. At this time the pressure chamber is substantially pressureless, so that no significant forces act on the piston sleeve 5 or valve disk 3. The medium in the pressure chamber 7 attempts to evade the movement of tappet 2, piston sleeve 5 and valve disk 3 and flows towards the inlet valve, so that in the embodiment of FIGS. 1 and 4 said valve is closed. The inlet valve according to FIG. 2 is already closed, whereas the inlet valve according to FIG. 6 only closes when the thickened area of the piston rod 40 contacts the valve sleeve 41. When the tappet 2 is moved further, then in the case of all the embodiments there is a pressure build-up in the pressure chamber 7 and in the case of a greater reduction of the enclosed volume the compressive forces rise on the valve disk 3 and the faces of the tappet 2 and piston sleeve 5 are guided. As the piston sleeve 5 is fitted displaceably on the tappet 2 and is only held in position by the valve spring 4, on exceeding a design-based pressure level, there is a movement of the piston sleeve 5 counter to the initial stressing force brought about by the valve spring 4.

As soon as the piston sleeve 5 has moved by a corresponding amount in the direction of the nozzle head 25, the sealing action of the sealing faces 14 between piston sleeve 5 and valve disk 3 is cancelled out. The medium enclosed in the pressure chamber 7 can flow out via cross-hole 9, medium channel 8, medium conduit 27 and discharge port 21. As from the time of the start of medium flow between valve disk 3 and piston sleeve 5 only a much lower force is required for further medium discharge, because an internal pressure in the pressure chamber is reduced by the outflowing medium. Immediately after the start of medium flow, the valve disk 3 is pressed by the flowing medium towards the inlet valve, so that there is a relative movement between valve disk 3 and tappet 2. The valve disk 3 can also elastically deform, which frees an additional flow cross-section for the medium. This process continues until either the nozzle head 25 runs up onto a not shown stop face or the face of the tappet 2 or valve disk 3 runs up onto the inlet valve. Since from said time no further pressure build-up can take place, up to a certain pressure level medium still flows through the cross-hole 9 and the following medium channels. As soon as there is a drop below the minimum pressure, the valve spring 4 brings about a transfer of the piston sleeve 5 into a sealing position with the valve disk 3. As soon as the operating force on the cover is significantly reduced, the return spring 6 brings about a movement of the tappet 2 in the direction of the nozzle head 25. As the outlet valve formed by the valve disk 3 and piston sleeve 5 is closed, a vacuum occurs in the pressure chamber 7 until the inlet valve opens and medium can flow from a not shown storage container via the riser. This continues until the piston sleeve 5 again comes to rest on a face of the sealing insert 24 and the movement of the tappet 2 is ended.

All the intended embodiments are in particular usable for cosmetic purposes. Preferably the corresponding inlet valves, as well as the valve housing and cylinder walls of the pressure chambers are light-transmitting and in particular transparent. This makes it possible to detect a colouring of the in particular cosmetic medium to be delivered.

The invention claimed is:

1. Valve mechanism for a pressure chamber, particularly a pumping device, with a tappet and a valve disk, the valve disk being attached to the tappet, wherein the valve disk is attached to the tappet so as to be movable relative thereto, the tappet being provided a piston sleeve, wherein the valve disk and piston sleeve have mutually corresponding support faces, which are provided with supporting force components acting radially to a pumping axis.

2. Valve mechanism according to claim 1, wherein on the tappet is provided at least one blocking element in order to limit the path of the valve disk.

3. Valve mechanism according to claim 1, wherein a medium channel is provided in the tappet.

4. Valve mechanism according to claim 3, wherein the medium channel is positioned in the tappet so as to be closable by the valve disk.

5. Valve mechanism according to claim 1, wherein the piston sleeve is loaded by at least one elastic restoring means and is attached to the tappet in relatively movable manner.

6. Valve mechanism according to claim 5, wherein the elastic restoring means is constituted by a valve spring as a separate component for the application of a valve closing force from the piston sleeve on the valve disk.

7. Valve mechanism according to claim 6, wherein the valve spring is supported on an annular shoulder of the piston sleeve and/or the tappet.

8. Valve mechanism for a pressure chamber, particularly a pumping device, with a tappet and a valve disk, the valve disk being attached to the tappet, wherein the valve disk is attached to the tappet so as to be movable relative thereto, wherein on the tappet is provided a piston sleeve, which is loaded by at least one elastic restoring means and is attached to the tappet in relatively movable manner, wherein the elastic restoring means is constituted by a valve spring as a separate component for the application of a valve closing force from the piston sleeve on the valve disk, wherein the valve spring is positioned concentrically to a return spring of a pumping device.

9. Valve mechanism according to claim 6, wherein the valve disk has a circumferential joint zone.

10. Valve mechanism according to claim 6, wherein a guide section is provided on the valve disk.

11. Valve mechanism according to claim 10, wherein the guide section is constructed as a cylinder wall.

12. Valve mechanism according to claim 10, wherein on the tappet is provided a guide zone corresponding to the guide section and permitting a relative movement of valve disk with respect to tappet.

13. Valve mechanism according to claim 1, wherein said tappet further comprises an annular groove, said annular groove bounded by upper and lower blocking elements; and wherein said valve disk is retained in the annular groove by the upper and lower blocking elements.

14. Valve mechanism according to claim 13, wherein said upper blocking element comprises a stop cone.

15. Valve mechanism according to claim 14, wherein said lower blocking element comprises a stop collar.

* * * * *